United States Patent
Isobe et al.

(10) Patent No.: US 8,461,255 B2
(45) Date of Patent: Jun. 11, 2013

(54) AQUEOUS POLYURETHANE RESIN, HYDROPHILIC RESIN, AND FILM

(75) Inventors: Masahiro Isobe, Kawasaki (JP); Akihiro Imai, Chiba (JP); Atsuko Tachibana, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 12/746,422

(22) PCT Filed: Dec. 4, 2008

(86) PCT No.: PCT/JP2008/072053
§ 371 (c)(1),
(2), (4) Date: Jun. 4, 2010

(87) PCT Pub. No.: WO2009/072561
PCT Pub. Date: Jun. 11, 2009

(65) Prior Publication Data
US 2010/0258762 A1    Oct. 14, 2010

(30) Foreign Application Priority Data
Dec. 6, 2007  (JP) .................................. 2007-316027

(51) Int. Cl.
*C08G 18/08* (2006.01)
*C08G 18/12* (2006.01)

(52) U.S. Cl.
USPC ........... 524/591; 524/589; 524/590; 524/839; 524/840; 528/904

(58) Field of Classification Search
USPC ....... 524/589, 590, 591, 839, 840; 428/423.1; 528/904
See application file for complete search history.

(56) References Cited

U.S. PATENT DOCUMENTS

| | | | | |
|---|---|---|---|---|
| 3,905,929 | A | * | 9/1975 | Noll .............................. 524/839 |
| 4,764,553 | A | * | 8/1988 | Mosbach et al. ............... 524/591 |
| 5,043,381 | A | * | 8/1991 | Coogan et al. ................. 524/591 |
| 5,169,895 | A | * | 12/1992 | Coogan et al. ................. 524/591 |
| 2008/0045650 | A1 | | 2/2008 | Isobe et al. |

FOREIGN PATENT DOCUMENTS

| | | |
|---|---|---|
| JP | 1-104612 | 4/1989 |
| JP | 11-106733 | 4/1999 |
| JP | 2005-60690 | 3/2005 |
| JP | 2005060690 A * | 3/2005 |
| JP | 2006-335950 | 12/2006 |
| JP | 2006-335951 | 12/2006 |
| WO | WO 2006/062165 A1 | 6/2006 |

OTHER PUBLICATIONS

International Search Report mailed Feb. 24, 2009, received in International Application No. PCT/JP2008/072053.

* cited by examiner

*Primary Examiner* — Michael L Leonard
(74) *Attorney, Agent, or Firm* — Foley & Lardner LLP

(57) ABSTRACT

An aqueous polyurethane resin is prepared by reaction of an isocyanate group-terminated prepolymer with a chain extender containing polyamine. The isocyanate group-terminated prepolymer is obtained by reaction of at least a polyisocyanate containing 50 wt % or more of a non-multiple ring polyisocyanate that does not contain an aromatic ring and an aliphatic ring, or contains one aromatic ring or aliphatic ring; polyoxyethylene polyol; and a polyoxyethylene side chain-containing active compound having two or more hydroxyl groups or isocyanate groups at its molecular terminal and having a polyoxyethylene group in the side chain.

3 Claims, No Drawings

AQUEOUS POLYURETHANE RESIN, HYDROPHILIC RESIN, AND FILM

TECHNICAL FIELD

This application is a U.S. National Phase application under 35 U.S.C. §371 of PCT Application No. PCT/JP2008/072053, filed Dec. 4, 2008, which claims priority under 35 U.S.C. §119(a)-(d) of Japanese Patent Application No. 2007-316027, filed Dec. 6, 2007.

The present invention relates to an aqueous polyurethane resin, a hydrophilic resin containing the aqueous polyurethane resin (first aqueous resin) and a second aqueous resin, and a film obtained by using the hydrophilic resin.

BACKGROUND ART

Water-swelling polymers are also called a water absorptive polymer. The water-swelling polymers are highly water-retentive due to hydrophilicity and closslinked network of the polymer itself, and are used, alone or in combination with other resins, in various fields that require hydrophilicity such as water permeability, moisture permeability, as well as water retentivity, water swelling property, antistatic characteristics, etc.

Meanwhile, there has been a demand for reduction of organic solvent use in view of its toxicity and air polluting characteristics, and therefore various investigations have been conducted in the field of various resins to make a transition from organic solvent-based resins which are prepared as a solution of the resins in an organic solvent, to aqueous resins which are prepared as an aqueous dispersion of the resins.

Thus, there has been a demand for a water-swelling polymer that can be blended easily in an aqueous resin and is capable of providing excellent hydrophilicity. For example, there has been proposed in Patent Document 1 (see below) that a polyurethane resin obtained by reaction of a urethane prepolymer having an anionic group with a polyoxyethylene group-containing polyamine has excellent compatibility with aqueous resins and is capable of providing excellent hydrophilicity.

Also, there has been known that a moisture-permeation and water-proof treatment is given to fibers in order to block rainwater but allow moisture (water vapor) such as sweat to pass through.

With respect to a coating agent for such a moisture-permeation and water-proof treatment, various investigations have been conducted to make a transition from organic solvent-based resins to aqueous resins.

For example, there has been proposed an aqueous polyurethane resin in which a polyurethane resin containing a hydrophobic macropolyol and a polyurethane resin containing a hydrophilic macropolyol with 50 wt % or more of a polyoxyethylene group are partially and chemically bonded through a chain extender (for example, see Patent Document 2 below).

Further, there has been proposed an aqueous polyurethane resin in which a polyurethane resin is dispersed or dissolved in water: the polyurethane resin being obtained by reaction of a hydrophobic macropolyol made of a polyoxyalkylenepolyol having an alkylene group with 3 to carbons and/or a polyester polyol; a polyisocyanate containing at least 4,4'-methylenebis(cyclohexyl isocyanate); a nonionic inner emulsifier containing two or more active hydrogen groups or two or more isocyanate groups, and having a polyoxyethylene group in its side chain; and a chain extender containing at least polyamine (see, for example, Patent Document 3 below).

Patent Document 1: Japanese Unexamined Patent Publication No. 2005-060690
Patent Document 2: International Patent Publication No. WO2006/062165 A1
Patent Document 3: Japanese Unexamined Patent Publication No. 2006-335950

DISCLOSURE OF THE INVENTION

Problem to be Solved by the Invention

However, the polyurethane resin described in Patent Document 1 above is anionic, and therefore when mixed with a nonionic resin or a cationic resin, especially with a cationic resin, there may be a case where the urethane resin is not stably dispersed in water.

Furthermore, in the aqueous polyurethane resin described in Patent Document 2 above, polyurethane resins are dispersed in water by an anionic inner emulsifier, to be specific, by amine salt of dialkanol fatty acid. Therefore, amines (such as triethylamine) are liberated as a VOC component when films are formed and dried. Furthermore, the aqueous polyurethane resin described in Patent Document 2 above is high in viscosity, which may cause a defect in handleability, and also may require a decrease in the solid content concentration of the aqueous polyurethane resin to be obtained.

Although the aqueous polyurethane resin described in Patent Document 3 above is nonionic and is capable of solving the above-described problems, 4,4'-methylenebis(cyclohexyl isocyanate) is an essential component therein, and therefore the film has a high initial modulus value and it is difficult to obtain soft texture.

An object of the present invention is to provide an aqueous polyurethane resin; a hydrophilic resin containing the aqueous polyurethane resin (first aqueous resin) and a second aqueous resin; and a film obtained by using the hydrophilic resin: the aqueous polyurethane resin being capable of ensuring stable water dispersion even when mixed with any of an anionic resin, a cationic resin, and a nonionic resin; decreasing liberation of VOC components when films are formed and dried; further, ensuring soft texture; and ensuring a film excellent in moisture permeability.

Means for Solving the Problem

To achieve the above object, an aqueous polyurethane resin of the present invention is obtained by reaction of an isocyanate group-terminated prepolymer with a chain extender containing polyamine, wherein the isocyanate group-terminated prepolymer is obtained by reaction of at least: a polyisocyanate containing 50 wt % or more of a non-multiple ring polyisocyanate that does not contain an aromatic ring and an aliphatic ring or contains one aromatic ring or aliphatic ring; polyoxyethylene polyol; and a polyoxyethylene side chain-containing active compound having two or more hydroxyl groups or isocyanate groups at its molecular terminal and having a polyoxyethylene group in its side chain.

In the aqueous polyurethane resin of the present invention, it is preferable that 50 to 85 wt % of the polyoxyethylene group is contained.

In the aqueous polyurethane resin of the present invention, it is preferable that the number average molecular weight of the polyoxyethylene polyol is 600 to 6000.

In the aqueous polyurethane resin of the present invention, it is preferable that the number average molecular weight of the polyoxyethylene group is 600 to 6000 in the polyoxyethylene side chain-containing active compound.

In the aqueous polyurethane resin of the present invention, it is preferable that the polyoxyethylene side chain-containing active compound has a chemical bond of at least one selected from the group consisting of a urea group, a urethane group, and an allophanate group.

In the aqueous polyurethane resin of the present invention, it is preferable that the polyamine is a polyoxyethylene group-containing polyamine.

In the aqueous polyurethane resin of the present invention, it is preferable that the polyamine contains an alkoxysilyl compound having a primary amino group or a primary amino group and a secondary amino group.

In the aqueous polyurethane resin of the present invention, it is preferable that the chain extender contains monoamine.

In the aqueous polyurethane resin of the present invention, it is preferable that the monoamine is a monoamino alcohol.

It is preferable that the aqueous polyurethane resin of the present invention is used as a hydrophilic modifier.

The hydrophilic resin of the present invention contains the above-described aqueous polyurethane resin as a first aqueous resin, and a second aqueous resin.

In the hydrophilic resin of the present invention, it is preferable that the second aqueous resin contains, as a raw material, at least one hydrophobic macropolyol selected from the group consisting of polyester polyol, polycarbonate polyol, and polyoxyalkylenepolyol having an alkylene group with 3 to 10 carbons, and 50 wt % or more of the hydrophobic macropolyol is contained relative to the total amount of the raw materials of the second aqueous resin.

In the hydrophilic resin of the present invention, it is preferable that the second aqueous resin further includes, as a raw material, a polyoxyethylene side chain-containing active compound.

In the hydrophilic resin of the present invention, it is preferable that 10 to 70 wt % of the polyoxyethylene group is contained.

It is preferable that the hydrophilic resin of the present invention is used as a coating agent for a moisture-permeation and water-proof treatment.

A film of the present invention is obtained by using the hydrophilic resin.

Effects of the Invention

In the aqueous polyurethane resin of the present invention, polyoxyethylene polyol and polyoxyethylene side chain-containing active compound contained therein are all nonionic, and therefore stable water dispersion can be ensured even when mixed with any of an anionic resin, a cationic resin, and a nonionic resin. Also, no amine is liberated when films are formed and dried, and thus the VOC components can be decreased. Furthermore, the aqueous polyurethane resin of the present invention is relatively low in viscosity, and therefore improvement in handleability can be achieved. Furthermore, the aqueous polyurethane resin of the present invention contains 50 wt % or more of the non-multiple ring polyisocyanate as the polyisocyanate, and therefore soft texture can be obtained.

Therefore, the aqueous polyurethane resin of the present invention is suitably used as a hydrophilic modifier.

Also, the hydrophilic resin of the present invention containing the aqueous polyurethane resin of the present invention is suitably used as a coating agent for a moisture-permeation and water-proof treatment.

Also, the film of the present invention obtained by using the hydrophilic resin of the present invention has excellent moisture-permeation and water-proof characteristics.

Embodiment of the Invention

The aqueous polyurethane resin of the present invention can be obtained by reaction of an isocyanate group-terminated prepolymer with a chain extender, and the isocyanate group-terminated prepolymer can be obtained by reaction of at least polyisocyanate, polyoxyethylene polyol, and a polyoxyethylene side chain-containing active compound.

In the present invention, the polyisocyanate contains 50 wt % or more, preferably 60 wt % or more, or more preferably 70 wt % or more of a non-multiple ring polyisocyanate. When the mixing ratio of the non-multiple ring polyisocyanate is below the above-described lower limit, gelation occurs when the isocyanate group-terminated prepolymer and the chain extender are allowed to react, and it becomes difficult to obtain an aqueous dispersion of the aqueous polyurethane resin.

The non-multiple ring polyisocyanate is a polyisocyanate that does not contain an aromatic ring and an aliphatic ring in one molecular, or a polyisocyanate that contains one aromatic ring or aliphatic ring in one molecular, and examples thereof include an aliphatic diisocyanate that does not contain an aromatic ring and an aliphatic ring, a single-aromatic ring-containing diisocyanate that contains one aromatic ring, and a single-aliphatic ring-containing diisocyanate that contains one aliphatic ring.

Examples of the aliphatic diisocyanate include trimethylene diisocyanate, tetramethylene diisocyanate, hexamethylene diisocyanate (abbreviation: HDI), pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatomethyl caproate.

Examples of the single-aromatic ring-containing diisocyanate include 2,4- or 2,6-tolylene diisocyanate or mixtures thereof (abbreviation: TDI), 4,4'-toluidine diisocyanate, 1,3- or 1,4-xylylene diisocyanate or mixtures thereof (abbreviation: XDI), and tetramethylxylylene diisocyanate.

Examples of the single-aliphatic ring-containing diisocyanate include 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (isophorone diisocyanate, abbreviation: IPDI), methyl-2,4-cyclohexane diisocyanate, methyl-2,6-cyclohexane diisocyanate, and 1,3- or 1,4-bis(isocyanatomethyl)cyclohexane or mixtures thereof (abbreviation: $H_6$XDI).

As the polyisocyanate, for example, multimers (for example, dimers, trimers (for example, isocyanurate-modified substance), pentamers, septamers, etc.) of the above-described non-multiple ring polyisocyanate (that is, aliphatic diisocyanate, single-aromatic ring-containing diisocyanate, and single-aliphatic ring-containing diisocyanate); an allophanate-modified substance (for example, an allophanate-modified substances produced by reaction of a non-multiple ring polyisocyanate with alcohols); a biuret-modified substance (for example, a biuret-modified substance produced by reaction of a non-multiple ring polyisocyanate with water or amines); a urea-modified substance (for example, a urea-modified substance produced by reaction of a non-multiple ring polyisocyanate with diamine); oxadiazinetrione (for example, oxadiazinetrione produced by reaction of a non-multiple ring polyisocyanate with carbon dioxide); and a carbodiimide-modified substance (a carbodiimide-modified substance produced by decarboxylation condensation reaction of a non-multiple ring polyisocyanate) may also be used.

The non-multiple ring polyisocyanate may be used alone or in combination of two or more. In view of strength, yellowing characteristics, and texture, the single-aliphatic ring-containing diisocyanate is preferable, and $IPD_1$ and $H_6XDI$ are more preferable.

As long as the non-multiple ring polyisocyanate is contained as the polyisocyanate at the above-described ratio, the multiple ring-containing polyisocyanate may also be used together.

The multiple ring-containing polyisocyanate is a polyisocyanate that contains two or more aromatic rings and/or aliphatic rings in one molecular, and examples thereof include a multiple aromatic ring-containing diisocyanate that contains two or more aromatic rings, and a multiple aliphatic ring-containing diisocyanate that contains two or more aliphatic rings.

Examples of the multiple aromatic ring-containing diisocyanate include m-phenylene diisocyanate, p-phenylene diisocyanate, 4,4'-diphenyl diisocyanate, 1,5-naphthalene diisocyanate, 4,4'-diphenylmethane diisocyanate (abbreviation: MDI), and 4,4'-diphenylether diisocyanate.

Examples of the multiple aliphatic ring-containing diisocyanate include 4,4'-methylenebis(cyclohexyl isocyanate) (abbreviation: $H_{12}MDI$), and 2,5 (2,6)-bis(isocyanatomethyl) bicyclo[2.2.1]heptane.

Furthermore, for example, multimers, an allophanate-modified substance, a biuret-modified substance, a urea-modified substance, oxadiazinetrione, and a carbodiimide-modified substance of the above-described multiple ring-containing polyisocyanate (that is, multiple aromatic ring-containing diisocyanate and multiple aliphatic ring-containing diisocyanate) may be used.

The multiple ring-containing diisocyanate may be used alone or in combination of two or more.

In the present invention, the polyoxyethylene polyol can be obtained by, for example, addition polymerization of ethylene oxide using a low-molecular-weight polyol (described later) as an initiator. Preferable example is polyethylene glycol.

The number average molecular weight of the polyoxyethylene polyol is, for example, 600 to 6000, or preferably 600 to 3000. When the number average molecular weight of polyoxyethylene polyol is below the above-described lower limit, viscosity of the aqueous polyurethane resin may become high, and softness of the film to be obtained may decrease, whereas when the number average molecular weight of polyoxyethylene polyol exceeds the above-described upper limit, water dispersion characteristics of the aqueous polyurethane resin may be reduced.

The number average molecular weight of the raw materials of the aqueous polyurethane resin can be calculated based on the hydroxyl group equivalent (ref. JIS K 1557-1 (2007)) and the functionality of the raw materials.

The polyoxyethylene polyol is blended so that the polyoxyethylene group in the aqueous polyurethane resin is, for example, 50 to 85 wt %, preferably 55 to 85 wt %, or more preferably 60 to 80 wt %, relative to the total amount of the polyoxyethylene side chain-containing active compound that is blended, and a high-molecular weight polyol (blended as necessary) containing an oxyethylene group such as polypropylenepolyethylene glycol to be described later. When the polyoxyethylene group in the aqueous polyurethane resin is set in the above-described range, improvement in moisture permeability of the film can be achieved.

When the polyoxyethylene group in the aqueous polyurethane resin is set in the above-described range, a high-molecular weight polyol and a low-molecular-weight polyol can be used together with the polyoxyethylene polyol.

Examples of the high-molecular weight polyol include polyoxypropylene polyol (for example, polypropylene glycol, polypropylenepolyethylene glycol (random or block copolymer of polypropylene oxide and polyethylene oxide)), polyoxybutylene polyol (for example, polytetramethylene ether glycol), polyester polyol (for example, alkylene (ethylene, and/or butylene) adipate and polycaprolactone polyol), and polycarbonate polyol (for example, polycarbonatediol).

The number average molecular weight of the high-molecular weight polyol is, for example, 400 to 6000, and the mixing ratio of the high-molecular weight polyol relative to the total amount of the raw materials (total charge amount) of the aqueous polyurethane resin is, for example, 0.5 to 15 wt %.

The low-molecular-weight polyol is a polyol having a number average molecular weight of below 400, and examples thereof include low molecular weight diols such as ethylene glycol, propylene glycol, 1,4-butyleneglycol, 1,3-butyleneglycol, 1,2-butyleneglycol, 1,6-hexanediol, neopentyl glycol, 3-methylpentanediol, dimethylolheptane, alkane (7 to 22 carbons) diol, diethylene glycol, triethylene glycol, dipropylene glycol, cyclohexanedimethanol, alkane-1,2-diol (17 to 20 carbons), hydrogenated bisphenol A, 1,4-dihydroxy-2-butene, 2,6-dimethyl-1-octene-3,8-diol, bishydroxyethoxybenzene, xylene glycol, and bishydroxyethylene terephthalate; and low-molecular-weight triols such as glycerin, 2-methyl-2-hydroxymethyl-1,3-propanediol, 2,4-dihydroxy-3-hydroxymethylpentane, 1,2,6-hexanetriol, 1,1,1-tris (hydroxymethyl) propane, and 2,2-bis(hydroxymethyl)-3-butanol.

The mixing ratio of the low-molecular-weight polyol relative to the total amount of the raw materials of the aqueous polyurethane resin (total charge amount) is, for example, 0.01 to 5 wt %.

In the present invention, the polyoxyethylene side chain-containing active compound is a compound having two or more hydroxyl groups or isocyanate groups at its molecular terminal and a polyoxyethylene group in the side chain, and examples thereof include a polyoxyethylene side chain-containing polyol having two or more hydroxyl groups at its molecular terminal and a polyoxyethylene group in the side chain; and a polyoxyethylene side chain-containing polyisocyanate having two or more isocyanate groups at its molecular terminal and a polyoxyethylene group in the side chain.

The polyoxyethylene side chain-containing polyol can be obtained, for example, as follows. First, diisocyanate (the above-described diisocyanate) and a one-end-terminated polyoxyethylene glycol (alkoxy ethylene glycol with its one end terminated with a C1 to 20 alkyl group) are subjected to urethane reaction such that the proportion of the isocyanate group in diisocyanate is excessive relative to the hydroxyl group in the one-end-terminated polyoxyethylene glycol, and thereafter, unreacted diisocyanate is removed as necessary, so that a polyoxyethylene chain-containing monoisocyanate is synthesized. Then, the polyoxyethylene chain-containing monoisocyanate and dialkanol amine (C1 to 20 dialkanol amine) are subjected to urea reaction.

In the preparation of the polyoxyethylene side chain-containing polyol, a preferable example of the one-end-terminated polyoxyethylene glycol is methoxypolyethylene glycol, a preferable example of the diisocyanate is aliphatic diisocyanate (for example, HDI), and an example of the dialkanol amine is diethanolamine.

The polyoxyethylene side chain-containing polyol thus obtained has, for example, a urethane group and a urea group, and represented by the following formula (1).

[Chem. 1]

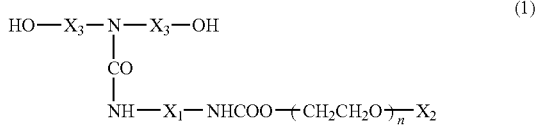

(where $X_1$ represents residual diisocyanate group (a portion of diisocyanate other than the isocyanate group portion), $X_2$ represents an alkyl group having 1 to 20 carbons, $X_3$ represents an alkylene group having 1 to 20 carbons, and n represents an integer of 13 to 140.)

The mixing ratio of the polyoxyethylene side chain-containing polyol relative to the total amount of the raw materials of the aqueous polyurethane resin (total charge amount) is, for example, 5 to 40 wt %.

The polyoxyethylene side chain-containing polyisocyanate can be obtained, for example, as follows. First, diisocyanate (the above-described diisocyanate) and a one-end-terminated polyoxyethylene glycol (alkoxy ethylene glycol with its one end terminated with a C1 to 20 alkyl group) are subjected to urethane reaction such that the proportion of the isocyanate group in diisocyanate is excessive relative to the hydroxyl group in the one-end-terminated polyoxyethylene glycol, and thereafter, unreacted diisocyanate is removed as necessary, so that a polyoxyethylene chain-containing monoisocyanate is synthesized. Then, the polyoxyethylene chain-containing monoisocyanate and diisocyanate are subjected to allophanate reaction.

In the preparation of the polyoxyethylene chain-containing polyisocyanate, a preferable example of the one-end-terminated polyoxyethylene glycol is methoxypolyethylene glycol, and a preferable example of the diisocyanate is aliphatic diisocyanate (for example, HDI).

The polyoxyethylene side chain-containing polyisocyanate thus obtained has, for example, a urethane group and an allophanate roup, and represented by the following formula (2).

[Chem. 2]

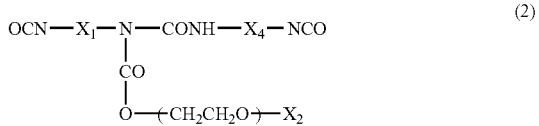

(where $X_1$ and $X_4$ represent the same or different residual diisocyanate group (a portion of diisocyanate other than the isocyanate group portion), $X_2$ represents an alkyl group having 1 to 20 carbons, and n represents an integer of 13 to 140.)

The mixing ratio of the polyoxyethylene side chain-containing polyisocyanate relative to the total amount of the raw materials of the aqueous polyurethane resin (total charge amount) is, for example, 5 to 40 wt %.

It is preferable that the polyoxyethylene side chain-containing active compound contains the polyoxyethylene group of, for example, 50 wt % or more, or preferably 60 to 90 wt %, and the number average molecular weight of the polyoxyethylene group is, for example, 600 to 6000, preferably 600 to 3000, or more preferably 800 to 2500.

When the number average molecular weight of the polyoxyethylene group in the polyoxyethylene side chain-containing active compound is below the above-described lower limit, water dispersion characteristics of the aqueous polyurethane resin may be reduced. Even when the number average molecular weight of the polyoxyethylene group in the polyoxyethylene side chain-containing active compound exceeds the above-described upper limit, water dispersion characteristics of the aqueous polyurethane resin may be reduced.

Then, the isocyanate group-terminated prepolymer is obtained by allowing polyisocyanate, a polyol component (contains polyoxyethylene polyol as an essential component, and contains a high-molecular weight polyol and a low-molecular-weight polyol as optional components.), and the polyoxyethylene side chain-containing active compound to react.

In this reaction, the above-described components are blended in an equivalent ratio of the isocyanate group to the hydroxyl group (NCO/OH) of more than 1, or preferably 1.1 to 10. Then, the above-described components are allowed to react by a known polymerizing method such as bulk polymerization or solution polymerization. Preferably, solution polymerization, by which reactivity and viscosity adjustment is easier, is used for the reaction of the above components.

In bulk polymerization, for example, the above-described components are blended under a nitrogen atmosphere and allowed to react at a reaction temperature of 75 to 85° C. for about 1 to 20 hours.

In solution polymerization, for example, the above-described components are blended in an organic solvent under a nitrogen atmosphere, and allowed to react at a reaction temperature of 20 to 80° C. for about 1 to 20 hours.

For the organic solvent, those organic solvents that are inactive to isocyanate groups and are highly hydrophilic are used, and examples thereof include acetone, methyl ethyl ketone, ethyl acetate, tetrahydrofuran, and acetonitrile.

In the above-described polymerization, for example, a reaction catalyst such as amine, tin, and lead system may be added as necessary. Also, the unreacted polyisocyanate may be removed from the obtained isocyanate group-terminated prepolymer, for example, by a known method such as distillation or extraction.

Then, to obtain the aqueous polyurethane resin of the present invention, the obtained isocyanate group-terminated prepolymer and a chain extender are allowed to react and to be dispersed in water.

In the present invention, an example of the chain extender is polyamine. Examples of the polyamine include polyamines, polyoxyethylene group-containing polyamines, and an alkoxysilyl compound (in the following, referred to as an amino group-containing alkoxysilyl compound.) having a primary amino group or having a primary amino group and a secondary amino group.

Examples of the polyamines include diamines such as ethylenediamine, 1,3-propanediamine, 1,4-butanediamine, 1,6-hexamethylenediamine, 1,4-cyclohexane diamine, 3-aminomethyl-3,5,5-trimethylcyclohexylamine (isophoronediamine), 4,4'-dicyclohexylmethanediamine, 2,5 (2,6)-bis(aminomethyl) bicyclo [2.2.1]heptane, 1,3-bis(aminomethyl)cyclohexane, hydrazine, and N-(2-aminoethyl) ethanolamine; triamines such as diethylenetriamine, triethylenetetramine, tetraethylenepentamine; tetraamines; and pentaamines.

Examples of the polyoxyethylene group-containing polyamine include polyoxyethylene ether diamine represented by the following formula (3), polyoxyalkylene ether diamine represented by the following formula (4), polyoxyethylene ether diamine represented by the following formula (5), and polyoxyethylene ether polyamine represented by the following formula (6).

To be specific, examples thereof include PEG#1000 diamine (corresponding to the formula (3)) by NOF corporation, JEFFERMIN ED-2003 (corresponding to the formula (4)), EDR-148 (corresponding to the formula (5)), and XTJ-512 (corresponding to the formula (6)) by Huntsman Inc.

The number average molecular weight of the polyoxyethylene group-containing polyamine is, for example, 100 to 20000, or preferably 140 to 10000.

[Chem. 3]

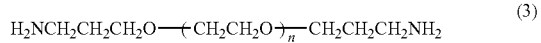

(3)

(where n represents polymerization degree.)

[Chem. 4]

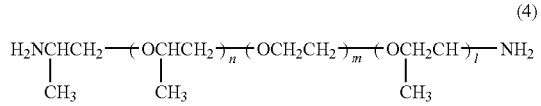

(4)

(where n, m, and l represent polymerization degree.)

[Chem. 5]

(5)

(where n represents polymerization degree.)

[Chem. 6]

(6)

(where m and n represent polymerization degree.)

Examples of the amino group-containing alkoxysilyl compound include an alkoxysilyl group-containing monoamine such as γ-aminopropyl triethoxysilane and N-phenyl-γ-aminopropyl trimethoxysilane; N-β(aminoethyl)γ-aminopropyltrimethoxysilane; and N-β(aminoethyl)γ-aminopropylmethyldimethoxysilane. By using the amino group-containing alkoxysilyl compound as the chain extender, strength of the obtained film can be improved.

These polyamines may be used alone or in combination, and preferably, the polyoxyethylene group-containing polyamine and the amino group-containing alkoxysilyl compound are used in combination. When used in combination, the mixing ratio of the polyoxyethylene group-containing polyamine relative to the total amount of the raw materials of the aqueous polyurethane resin (total charge amount) is, for example, 1 to 15 wt %, and the mixing ratio of the amino group-containing alkoxysilyl compound relative to the total amount of the raw materials of the aqueous polyurethane resin (total charge amount) is, for example, 0.05 to 2 wt %.

Further, monoamines may be used as the chain extender along with the above-described polyamines. By using monoamine, the viscosity of the obtained aqueous polyurethane resin can be made low.

Examples of the monoamine include alkylamines such as 2-ethylhexylamine and cyclohexylamine; dialkylamines such as diethylamine, dipropylamine, and dibutylamine; and monoamino alcohols such as monoethanolamine and diethanolamine.

These monoamines may be used alone or in combination, and preferably, monoamino alcohols are used. When monoamine is used in combination, the mixing ratio of the monoamine relative to the total amount of the raw materials of the aqueous polyurethane resin (total charge amount) is, for example, 0.01 to 1 wt %.

Further, as the chain extender, the above-described low-molecular-weight polyol may be used along with the above-described polyamine. The low-molecular-weight polyol is used in an appropriate mixing ratio relative to polyamine, according to the purpose and use.

As the chain extender, preferably, polyamine and monoamine are used in combination, and further preferably, the polyoxyethylene group-containing polyamine, the amino group-containing alkoxysilyl compound, and monoamine are used in combination. By using these in combination, improvement in water dispersion characteristics of the aqueous polyurethane resin, and in strength of the obtained film can be achieved.

The isocyanate group-terminated prepolymer and the chain extender are allowed to react in water, for example, as follows. First, the isocyanate group-terminated prepolymer is added in water to be dispersed in water, and a chain extender is added thereto, so that the isocyanate group-terminated prepolymer is chain-extended by the chain extender.

To disperse the isocyanate group-terminated prepolymer in water, the isocyanate group-terminated prepolymer is added in water while stirring, in such a proportion of 20 to 500 parts by weight of water relative to 100 parts by weight of the isocyanate group-terminated prepolymer.

Thereafter, a chain extender is added dropwise in the aqueous dispersion of the isocyanate group-terminated prepolymer while stirring, such that the equivalent ratio of the active hydrogen group (an amino group and a hydroxyl group) in the chain extender relative to the isocyanate group in the isocyanate group-terminated prepolymer (active hydrogen group/isocyanate group) is, for example, 0.8 to 1.2.

It is preferable that the chain extender is added dropwise at a temperature of 35° C. or less, and thereafter, for example, the reaction is completed with further stirring at normal temperature. As described above, the aqueous polyurethane resin of the present invention can be obtained as an aqueous dispersion (aqueous dispersion having a solid content concentration of, for example, 10 to 60 wt %, preferably 20 to 50 wt %, or more preferably 25 to 45 wt %).

As opposed to the above, the isocyanate group-terminated prepolymer can be dispersed in water by adding water to the isocyanate group-terminated prepolymer, and then adding a chain extender thereto, so that the isocyanate group-terminated prepolymer is chain-extended by the chain extender.

When the isocyanate group-terminated prepolymer is obtained by solution polymerization, the organic solvent is removed, for example, by heating at an appropriate temperature under reduced pressure after the reaction.

In the aqueous polyurethane resin obtained as described above, 50 to 85 wt %, preferably 55 to 85 wt %, or more preferably 60 to 80 wt % of the polyoxyethylene group is contained in the aqueous polyurethane resin (that is, in the solid content of the aqueous dispersion). When the ratio of the polyoxyethylene group in the polyurethane resin is below the above-described lower limit, moisture permeability of the film may decrease, and when the ratio of the polyoxyethylene group in the aqueous polyurethane resin exceeds the above-described upper limit, strength of the film may decrease.

The viscosity of the aqueous dispersion of the aqueous polyurethane resin is, for example, 20000 mPa·s (25° C.) or less, preferably 12000 mPa·s (25° C.) or less, or more preferably 9000 mPa·s (25° C.) or less. The viscosity can be measured by using a B-type viscometer.

In the aqueous polyurethane resin of the present invention, polyoxyethylene polyol and the polyoxyethylene side chain-containing active compound contained therein are all nonionic, and therefore even when mixed with any of an anionic resin, a cationic resin, and a nonionic resin, stable water dispersion can be ensured. Also, when the film is formed and dried, no amines are liberated, and therefore VOC components can be decreased. Furthermore, the aqueous polyurethane resin of the present invention is relatively low in viscosity, and therefore improvement in handleability can be achieved. Furthermore, in the aqueous polyurethane resin of the present invention, 50 wt % or more of the non-multiple ring polyisocyanate is contained as polyisocyanate, and therefore soft texture can be obtained.

Thus, the aqueous polyurethane resin of the present invention brings out excellent water swelling property based on high hydrophilicity, is high in stability, and is excellent in compatibility with other aqueous resins. Then, when the aqueous polyurethane resin is blended with other aqueous resins as a hydrophilic modifier, hydrophilicity such as water permeability, moisture permeability, water retentivity, water swelling property, and antistatic characteristics of the aqueous resin can be significantly improved.

Then, by using the aqueous polyurethane resin as a first aqueous resin and another aqueous resin as a second aqueous resin, i.e., by blending the first aqueous resin and the second aqueous resin, a film made of a hydrophilic resin excellent in moisture-permeation and water-proof characteristics can be obtained.

There is no particular limitation for the second aqueous resin. For example, the second aqueous resin is prepared as an emulsion or an aqueous solution of the second aqueous resin so that the second aqueous resin is blended in any amount. Specific examples thereof include water-based emulsions such as a vinyl acetate emulsion, an acrylic emulsion, a polyurethane emulsion, a polyester emulsion, and a polyolefin emulsion; aqueous solutions of synthetic resin such as an aqueous solution of polyvinylalcohol, an aqueous solution of polyvinylpyrrolidone, and an aqueous solution of polyvinyl acetal; and aqueous solutions of natural polymer such as starch and gelatin.

A preferable example of the second aqueous resin is an aqueous polyurethane resin (in the following, referred to as a second aqueous polyurethane resin) that is high in hydrophobicity compared with the first aqueous resin.

Such a second aqueous polyurethane resin can be obtained, for example, as follows. At least polyisocyanate, hydrophobic macropolyol, and a hydrophilic group-containing active compound as raw materials are allowed to react to synthesize an isocyanate group-terminated prepolymer, and then the isocyanate group-terminated prepolymer and a chain extender as a raw material are allowed to react.

As the polyisocyanate, both of the non-multiple ring polyisocyanate and the multiple ring-containing polyisocyanate described above may be used without particular limitation. Preferable example is a multiple ring-containing polyisocyanate, and more preferable example is a multiple aliphatic ring-containing diisocyanate.

Examples of the hydrophobic macropolyol include polyester polyol, polycarbonate polyol, and polyoxypolyalkylenepolyol having an alkylene group with 3 to 10 carbons.

Examples of the polyester polyol include a polyester polyol produced by reaction of, for example, one, two, or more of the above-described low-molecular-weight polyol with a polycarboxylic acid such as malonic acid, maleic acid, succinic acid, adipic acid, azelaic acid, tartaric acid, pimelic acid, sebacic acid, oxalic acid, terephthalic acid, isophthalic acid, maleic acid, maleic anhydride, fumaric acid, dimer acid, trimellitic acid or derivatives thereof; and a polycaprolactone polyol produced by ring-opening polymerization of ε-caprolactone, etc.

Examples of the polycarbonate polyol include a polycarbonate polyol produced by reaction of one, two, or more of the above-described low-molecular-weight polyol with, for example, carbonates such as dimethyl carbonate, diphenyl carbonate, ethylene carbonate, and phosgene.

Examples of the polyoxyalkylenepolyol having an alkylene group with 3 to 10 carbons include polyoxyalkylenepolyols produced by ring-opening addition polymerization of cyclic ethers such as propyleneoxide, oxetan, tetrahydrofuran, and tetrahydropyran, using, for example, the above-described low-molecular-weight polyol as the initiator. Examples thereof include polyoxypropylene polyol and polytetramethylene ether polyol. Preferable example is a polyoxyalkylene polyol having an alkylene group with 3 to 7 carbons, and more preferable example is a polyoxyalkylene polyol having an alkylene group with 4 to 6 carbons.

The number average molecular weight of these hydrophobic macropolyols is, for example, 300 to 10000, or preferably 500 to 5000.

For example, 50 wt % or more, or preferably 60 wt % or more of the hydrophobic macropolyol is blended relative to the total amount of the raw materials of the second aqueous polyurethane resin (total charge amount). By containing 50 wt % or more of the hydrophobic macropolyol, mechanical strength of the hydrophilic resin can be improved.

In the synthesis of the second aqueous polyurethane resin, the above-described low-molecular-weight polyol may be used as a raw material in combination with the hydrophobic macropolyol. When the low-molecular-weight polyol is used in combination, the mixing ratio of the low-molecular-weight polyol relative to the total amount of the raw materials of the second aqueous polyurethane resin (total charge amount) is, for example, 0.01 to 5 wt % or less.

Examples of the hydrophilic group-containing active compound include a nonionic group-containing active compound and an ionic group-containing active compound.

Examples of the nonionic group-containing active compound include polyoxyethylene glycol and the above-described polyoxyethylene side chain-containing active compound. In the nonionic group-containing active compound, the number average molecular weight of the nonionic group, that is, the polyoxyethylene group, is, for example, 600 to 6000.

The ionic group-containing active compound is, for example, a compound having both of an anionic group such as carboxylic acid or a cationic group such as quaternary amine; and two or more active hydrogen groups such as a hydroxyl group or an amino group. A preferable example is a compound having both of an anionic group and two or more hydroxyl groups; and a more preferable example is a compound having both carboxylic acid and two hydroxyl groups. Examples of such a compound include dimethylol propionic acid and dimethylol butanoic acid.

Examples of these hydrophilic group-containing active compounds include, preferably, a polyoxyethylene side chain-containing active compound, and more preferably, a polyoxyethylene side chain-containing polyol.

The mixing ratio of the hydrophilic group-containing active compound relative to the total amount of the raw materials of the second aqueous polyurethane resin (total charge amount) is, in the case of the nonionic group-containing active compound, for example, 5 to 25 wt %, and in the case of the ionic group-containing active compound, 1.5 to 8 wt %.

To obtain the isocyanate group-terminated prepolymer, the above-described component is blended such that the equivalent ratio of the isocyanate group relative to the hydroxyl group (NCO/OH) exceeds 1, preferably 1.05 to 4.0, and the above-described component is allowed to react in the same manner as the above-described method.

When the ionic group-containing active compound is blended, a neutralizing agent (for example, in the case of the anionic group, a tertiary amine such as triethylamine) is added after the reaction to neutralize the ionic group.

The isocyanate group-terminated prepolymer can be prepared without blending the hydrophilic group-containing active compound, for example, by allowing polyisocyanate, a hydrophobic macropolyol, and, as necessary, a low-molecular-weight polyol to react, and then adding an emulsifier.

Thereafter, the isocyanate group-terminated prepolymer and a chain extender are allowed to react in water in the same manner as the above-described method, so that a second aqueous polyurethane resin is obtained.

Examples of the chain extender include the above-described chain extenders, and preferably, polyamines are used.

The second aqueous polyurethane resin is thus obtained as an aqueous dispersion (an aqueous dispersion having a solid content concentration of, for example, 10 to 60 wt %, or preferably 20 to 50 wt %).

It is preferable that the second aqueous resin has mechanical strength of the following when cast (for example, when cast as a film having a width of 10 mm and a thickness of 0.1 mm): a tensile strength of, for example, 6 MPa or more, 8 MPa or more, or particularly 10 MPa or more; and an elongation percentage of, for example, 200% or more, 300% or more, or particularly 400% or more. Furthermore, it is preferable that the water swelling percentage when cast with the conditions as described above is, for example, 20% or less, 10% or less, particularly 5% or less.

Then, by blending the above-described aqueous polyurethane resin as the first aqueous resin in such a second aqueous resin, a film made of a hydrophilic resin excellent in moisture-permeation and water-proof characteristics can be obtained.

Upon blending the first aqueous resin and the second aqueous resin, a compatibilizer such as N-methylpyrrolidone and N,N-dimethylformamide, and a curing agent such as blocked isocyanate (for example, tolylene diisocyanate-based blocked isocyanate) may also be blended together with these resins.

The first aqueous resin and the second aqueous resin are blended such that the mixing ratio of the first aqueous resin relative to the total of the first aqueous resin (the solid content of the aqueous dispersion of the first aqueous resin) and the second aqueous resin (the solid content of the aqueous dispersion of the second aqueous resin) is, for example, 20 to 80 wt %, or preferably 30 to 70 wt %. When the mixing ratio of the first aqueous resin is below 20 wt %, moisture permeability of the film obtained by casting may decrease, and when the ratio exceeds 80 wt %, strength of the film obtained by casting may decrease.

By casting the hydrophilic resin of the present invention, a film having moisture-permeation and water-proof characteristics can be obtained. The film may be cast as any of a microporous film or a nonporous film.

In particular, by casting the resin onto a foundation cloth, a moisture-permeation and water-proof treatment can be given to the foundation cloth, so that, for example, a moisture-permeable and water-proof material used for apparel can be obtained.

Examples of the foundation cloth include fabric, knit, and unwoven cloth which are made of fibers such as polyester, nylon, and cotton.

For the casting of the hydrophilic resin onto a foundation cloth, for example, methods such as a laminating method and a direct coating method are used, and the methods are selected appropriately according to the application.

In the laminating method, for example, the hydrophilic resin is applied on the surface of an exfoliate paper and a heat treatment is given. Thereafter, the exfoliate paper is laminated onto a cloth and heat-fused thereto.

In the direct coating method, the resin is directly applied on the surface of a foundation cloth or an exfoliate paper, using a usual coating method, for example, by using a knife coater.

Then, by such casting, the surface of the foundation cloth is covered with a film made of the hydrophilic resin having moisture-permeation and water-proof characteristics, and thus a moisture-permeation and water-proof treatment is given to the surface of the foundation cloth. The foundation cloth to which the moisture-permeation and water-proof treatment is given is used for apparel as a moisture-permeation and water-proof material.

The moisture-permeation and water-proof characteristics are characteristics of a film to not allow water such as rain, etc. to pass through, but to pass through moisture (water vapor), and for example, in a moisture-permeable and water-proof material used for apparel, water vapor due to sweat from a body is released outside the cloth, and rain is prevented from going inside the cloth.

It is necessary that characteristics such as conformability to foundation cloth, abrasion resistance, and break resistance are sufficiently ensured for the hydrophilic resin of the present invention. Therefore, a film made by casting the hydrophilic resin of the present invention has the following mechanical strength: a tensile strength of, for example, 3 MPa or more, 4 MPa or more, or more preferably 6 MPa or more; and an elongation percentage of, for example, 200% or more, 300% or more, or more preferably 400% or more.

Furthermore, moisture permeability of the hydrophilic resin of the present invention is, after casting the resin to form a film having a thickness of 0.02 mm, 3000 (g/m$^2$·24 hrs) or more, or preferably 4000 (g/m$^2$·24 hrs) or more based on the moisture permeability test of A-1 method (according to JIS L1099 (2006)).

A curing catalyst and various additives may be appropriately blended to the aqueous polyurethane resin, the second aqueous polyurethane resin, and the hydrophilic resin, in such a range that does not inhibit the above-described excellent effects of the present invention. Examples of the various additives include a plasticizer, an antifoaming agent, a leveling agent, an antifungal agent, an antirust agent, a delusterant, a fire retardant, a thixotropic agent, a tackifier, a thickening agent, a lubricant, an antistatic agent, a surfactant, a reaction retardant, an antioxidant, a ultraviolet absorber, a hydrolysis inhibitor, a weathering stabilizer, a dye, an inorganic pigment, an organic pigment, an extender, a curing agent, and an anti-tack agent.

Examples of the curing agent include an isocyanate-based curing agent, and a preferable example is a water dispersible polyisocyanate-based curing agent.

Examples of the anti-tack agent include inorganic powder, and a preferable example is silicon dioxide powder.

The mixing ratio of various additives is appropriately selected according to its purposes and applications.

The aqueous polyurethane resin and the hydrophilic resin of the present invention can be used widely, not only in the above-described field of apparel, but also in various industrial fields, such as automobiles, electronic devices, building materials, artificial leather, and film treatment.

EXAMPLES

While in the following, the present invention is described in further detail with reference to Synthesis Examples, Examples, and Comparative Examples, the present invention is not limited to any of them by no means. "Parts", and "%" are weight-basis, unless otherwise specified.

Synthesis Example 1

Synthesis of Polyoxyethylene Side Chain-Containing Polyol A

A reactor equipped with a thermometer, a nitrogen gas inlet tube, and a stirrer was charged with 627.1 parts of hexamethylene diisocyanate (TAKENATE 700 manufactured by Mitsui Chemicals Polyurethanes, Inc.) and 372.9 parts of methoxypolyethylene glycol (MPEG-1000, manufactured by TOHO Chemical Industry Co., LTD.) that was heated to a temperature of 50° C. and having a number average molecular weight of 1000 while introducing a nitrogen gas, and the mixture was allowed to react at 80° C. for 6 hours. After reaching a predetermined isocyanate group content, unreacted hexamethylene diisocyanate was removed by using a Smith type wiped film evaporator, so that a polyoxyethylene chain-containing monoisocyanate was obtained. The calculated number average molecular weight of the polyoxyethylene chain-containing monoisocyanate was 1168 g/mol.

Then, a reactor equipped with a thermometer, a nitrogen gas inlet tube, and a stirrer was charged with 83.9 parts of diethanolamine at room temperature while introducing a nitrogen gas. The polyoxyethylene chain-containing monoisocyanate A in an amount of 916.1 parts was added thereto while cooling, and the mixture was allowed to react at 60° C. for 3 hours. With an infrared spectrum, production of urea bonds was confirmed, thus a polyoxyethylene side chain-containing polyol A was obtained. The polyoxyethylene side chain-containing polyol A contained 78.5 wt % of the polyoxyethylene group, and the calculated number average molecular weight was 1275 g/mol.

Example 1

Synthesis of Aqueous Polyurethane Resin A

A four-neck flask equipped with a reflux condensing tube, a nitrogen inlet tube, a thermometer, and a stirrer was charged with 52.5 g of 1,3-(bisisocyanatomethyl)cyclohexane (trade name: TAKENATE 600, manufactured by Mitsui Chemicals Polyurethanes, Inc.), 177.9 g of polyethylene glycol (trade name: PEG-1000, manufactured by TOHO Chemical Industry Co., LTD.) having a number average molecular weight of 1000, 41.7 g of the polyoxyethylene side chain-containing polyol A, and 120 g of acetonitrile; and the mixture was allowed to react under a nitrogen atmosphere with the reaction solution temperature adjusted to 75 to 78° C. and with a slight amount of stannous octoate (reaction catalyst, trade name: Stanoct, manufactured by API corporation) added thereto, so that the reaction rate of 99% or more was achieved in 7 hours. Then, the reaction product was cooled to 30° C., so that an isocyanate group-terminated prepolymer was obtained.

Next, 900 g of water was added to a reaction vessel equipped with a homodisper capable of high-speed stirring, and the isocyanate group-terminated prepolymer was added thereto with the temperature adjusted to 25° C. while stirring and mixing at a rate of 2000 min$^{-1}$, so that the isocyanate group-terminated prepolymer was dispersed in water.

Thereafter, 25.1 g of polyoxyethylene diamine (trade name: PEG/41000 diamine, manufactured by NOF corporation) having a number average molecular weight of 1000, 1.7 g of N-β (aminoethyl) γ-aminopropylmethyldimethoxysilane (amine value 544, trade name: KBM602, manufactured by Shin-Etsu Chemical Co., Ltd.), and 1 g of monoethanolamine were added thereto, and the mixture was stirred at 30 to 35° C. for 3 hours. Afterwards, acetonitrile and a portion of water were removed under reduced pressure, so that 1000 g of an aqueous dispersion of an aqueous polyurethane resin A was prepared.

The content of the polyoxyethylene group (EO content (wt %)) in the obtained aqueous polyurethane resin A calculated based on the mixing formulation, and the solid content (wt %) and the viscosity (mPa·s) of its aqueous dispersion are shown in Table 1.

Examples 2 and 3

Synthesis of Aqueous Polyurethane Resins B and C

Based on the mixing formulation shown in Table 1 below, an aqueous dispersion of an aqueous polyurethane resin B (Example 2) and an aqueous dispersion of an aqueous polyurethane resin C (Example 3) were prepared in the same manner as in Example 1.

Also, as in Example 1, the content of the polyoxyethylene group (EO content (wt %)) in the obtained aqueous polyurethane resins B and C calculated based on the mixing formulation, and the solid content (wt %) and the viscosity (mPa·s) of their aqueous dispersions are shown in Table 1.

Comparative Example 1

Synthesis of Aqueous Polyurethane Resin D

Based on the mixing formulation shown in Table 1 below, an aqueous dispersion of an aqueous polyurethane resin D was prepared in the same manner as in Example 1. However, 2 minutes after adding the chain extender, the viscosity of the aqueous dispersion began to be high, and gellation was caused after 5 minutes.

Comparative Example 2

Synthesis of Aqueous Polyurethane Resin E

A four-neck flask equipped with a reflux condensing tube, a nitrogen inlet tube, a thermometer, and a stirrer was charged with 38.2 g of 1,3-(bisisocyanatomethyl)cyclohexane (trade name: TAKENATE 600, manufactured by Mitsui Chemicals Polyurethanes, Inc.), 25.8 g of 4,4'-methylenebis(cyclohexyl isocyanate)(trade name: Desmodule W, manufactured by Bayer Inc.), 124.8 g of polyethylene glycol (trade name: PEG-1000, manufactured by TOHO Chemical Industry Co., LTD.) having a number average molecular weight of 1000, 13.6 g of dimethylol propionic acid (trade name: Bis-MPA, manufactured by Perstorp), and 100 g of acetonitrile; and the mixture was allowed to react under a nitrogen atmosphere with the reaction solution temperature adjusted to 75 to 78° C. and with a slight amount of stannous octoate (reaction catalyst, trade name: Stanoct, manufactured by API corporation) added thereto, so that the reaction rate of 99% or more was achieved in 7 hours. Then, the reaction product was cooled to 30° C., and 10.2 g of triethylamine was added thereto while stirring to sufficiently neutralize, so that an isocyanate group-terminated prepolymer was obtained.

Next, 900 g of water was added to a reaction vessel equipped with a homodisper capable of high-speed stirring, and the isocyanate group-terminated prepolymer was added thereto with the temperature adjusted to 25° C. and while stirring and mixing at a rate of 2000 $min^{-1}$, so that the isocyanate group-terminated prepolymer was dispersed in water.

Thereafter, 33.7 g of polyoxyethylene diamine (trade name: PEG#1000 diamine, manufactured by NOF corporation) having a number average molecular weight of 1000, 2.3 g of N-β (aminoethyl) γ-aminopropylmethyldimethoxysilane (amine value 544, trade name: KBM602, manufactured by Shin-Etsu Chemical Co., Ltd.), and 1.4 g of monoethanolamine were added thereto, and the mixture was stirred at 30 to 35° C. for 3 hours. Afterwards, acetonitrile and a portion of water were removed under reduced pressure, so that 1000 g of an aqueous dispersion of an aqueous polyurethane resin E was prepared.

The content of the polyoxyethylene group (EO content (wt %)) in the obtained aqueous polyurethane resin E calculated based on the mixing formulation, and the solid content (wt %) and the viscosity (mPa·s) of its aqueous dispersion are shown in Table 1.

POE side chain polyol A: polyoxyethylene side chain-containing polyol A

PEG#1000 diamine: polyoxyethylene diamine having a number average molecular weight of 1000, manufactured by NOF corporation KBM602: N-β(aminoethyl) γ-aminopropylmethyldimethoxysilane (amine value 544), manufactured by Shin-Etsu Chemical Co., Ltd.

Synthesis Example 2

Synthesis of Second Aqueous Polyurethane Resin A

A four-neck flask equipped with a reflux condensing tube, a nitrogen inlet tube, a thermometer, and a stirrer was charged with 81.8 g of 4,4"-methylenebis(cyclohexyl isocyanate)(trade name: Desmodule W, manufactured by Bayer Inc.), 217.2 g of polycaprolactonediol (trade name: PLACCEL 220, manufactured by Daicel Chemical Industries Ltd.) having a number average molecular weight of 2000, 5.1 g of ethylene glycol, 41.5 g of the polyoxyethylene side chain-containing polyol A, and 350 g of acetonitrile, and the mixture was allowed to react under a nitrogen atmosphere with the reaction solution temperature adjusted to 75 to 78° C. and with a slight amount of stannous octoate (reaction catalyst, trade name: Stanoct, manufactured by API corporation) added thereto, so that the reaction rate of 99% or more was achieved in 7 hours. Then, the reaction product was cooled to 30° C., so that an isocyanate group-terminated prepolymer was obtained.

TABLE 1

| Mixing Formulation (g) | Example 1 | Example 2 | Example 3 | Comparative Example 1 | Comparative Example 2 |
|---|---|---|---|---|---|
| Aqueous Polyurethane Resin | A | B | C | D | E |
| H₆XDI | 52.5 | — | 31.9 | — | 38.2 |
| IPDI | — | 56.7 | — | — | — |
| H₁₂MDI | — | — | 21.6 | 66.7 | 25.8 |
| PEG-1000 | 177.9 | 167.7 | 163.7 | 168.7 | 124.8 |
| POE Side Chain Polyol A | 41.7 | 39.9 | 38.4 | 39.5 | — |
| Dimethylol Propionic Acid | — | — | — | — | 13.6 |
| Triethylamine | — | — | — | — | 10.2 |
| PEG#1000 Diamine | 25.1 | 23.7 | 22 | 22.6 | 33.7 |
| KBM-602 | 1.7 | 1.6 | 1.5 | 1.6 | 2.3 |
| Monoethanolamine | 1 | 1 | 0.9 | 0.9 | 1.4 |
| Acetonitrile | 120 | 120 | 120 | 120 | 100 |
| Water | 900 | 900 | 900 | 900 | 900 |
| EO Content (wt %)/Solid Content | 78.5 | 76.6 | 77 | 74 | 67.6 |
| Solid Content (wt %)/Aqueous Dispersion | 30 | 29 | 28 | Caused Gelation | 25 |
| Viscosity (mPa·s/25° C.)/Aqueous Dispersion | 1500 | 3700 | 7100 | — | 21000 |

Abbreviations in Table 1 are described below.

H₆XDI: 1,3-bis(isocyanatomethyl) cyclohexane, trade name TAKENATE 600, manufactured by Mitsui Chemicals Polyurethanes, Inc.

IPDI: isophorone diisocyanate, manufactured by Evonic Degussa AG

H₁₂MDI: 4,4'-methylenebis(cyclohexyl isocyanate), trade name Desmodule W, manufactured by Bayer Inc.

PEG-1000: polyethylene glycol having a number average molecular weight of 1000, manufactured by TOHO Chemical Industry Co., LTD.

Then, 700 g of water having a temperature of 25° C. was gradually added thereto, so that the isocyanate group-terminated prepolymer was dispersed in water. Thereafter, 14.4 g of isophorone diamine was added thereto, and the mixture was stirred at 30 to 35° C. for 3 hours. Afterwards, acetonitrile and a portion of water were removed under reduced pressure, so that 1000 g of an aqueous dispersion of a second aqueous polyurethane resin A was prepared.

The content of the polyoxyethylene group (EO content (wt %)) in the obtained second aqueous polyurethane resin A calculated based on the mixing formulation, and the solid content (wt %) and the viscosity (mPa·s) of its aqueous dispersion are shown in Table 2.

Synthesis Examples 3 and 4

Synthesis of Second Aqueous Polyurethane Resins B and C

Based on the mixing formulation shown in Table 2 below, an aqueous dispersion of a second aqueous polyurethane resin B (Synthesis Example 3), and an aqueous dispersion of a second aqueous polyurethane resin C (Synthesis Example 4) were prepared in the same manner as in Synthesis Example 2.

Also, as in Synthesis Example 2, the content of the polyoxyethylene group (EU content (wt %)) in the obtained second aqueous polyurethane resins B and C calculated based on the mixing formulation, and the solid content (wt %) and the viscosity (mPa·s) of their aqueous dispersion are shown in Table 2.

Synthesis Example 5

Synthesis of Second Aqueous Polyurethane Resin D

A four-neck flask equipped with a reflux condensing tube, a nitrogen inlet tube, a thermometer, and a stirrer was charged with 74.4 g of 4,4'-methylenebis(cyclohexyl isocyanate)(trade name: Desmodule W, manufactured by Bayer Inc.), 152.8 g of polytetramethylene ether glycol (trade name: PTG2000SN, manufactured by Hodogaya Chemical Co., Ltd.) having a number average molecular weight of 2000, 3.6 g of ethylene glycol, 9.2 g of dimethylol propionic acid (trade name: Bis-MPA, manufactured by Perstorp), and 250 g of acetonitrile; and the mixture was allowed to react under a nitrogen atmosphere with the reaction solution temperature adjusted to 75 to 78° C. and with a slight amount of stannous octoate (reaction catalyst, trade name: Stanoct, manufactured by API corporation) added thereto, so that the reaction rate of 99% or more was achieved in 7 hours. Then, the reaction product was cooled to 30° C., and 7 g of triethylamine was added while stirring to sufficiently neutralize, so that an isocyanate group-terminated prepolymer was obtained.

Next, 950 g of water was added to a reaction vessel equipped with a homodisper capable of high-speed stirring, and the isocyanate group-terminated prepolymer was added thereto with the temperature adjusted to 25° C. and while stirring and mixing at a rate of 2000 min$^{-1}$, so that the isocyanate group-terminated prepolymer was dispersed in water.

Thereafter, 13.1 g of isophorone diamine was added thereto, and the mixture was stirred at 30 to 35° C. for 3 hours. Afterwards, acetonitrile and a portion of water were removed under reduced pressure, so that 1000 g of an aqueous dispersion of a second aqueous polyurethane resin D was prepared.

The content of the polyoxyethylene group (EO content (wt %)) in the obtained second aqueous polyurethane resin D calculated based on the mixing formulation, and the solid content (wt %) and the viscosity (mPa·s) of its aqueous dispersion are shown in Table 2.

TABLE 2

| Mixing Formulation (g) | Synthesis Example 2 | Synthesis Example 3 | Synthesis Example 4 | Synthesis Example 5 |
|---|---|---|---|---|
| Second Aqueous Polyurethane Resin | A | B | C | D |
| H$_{12}$MDI | 81.8 | 81.8 | 81.8 | 74.4 |
| PLACCEL 220 | 217.2 | — | — | — |
| PTG2000SN | — | 217.2 | — | 152.8 |
| UH-200 | — | — | 217.2 | — |
| Ethylene Glycol | 5.1 | 5.1 | 5.1 | 3.6 |
| POE Side Chain polyol A | 41.5 | 41.5 | 41.5 | — |
| Dimethylol Propionic Acid | — | — | — | 9.2 |
| Triethylamine | — | — | — | 7 |
| Isophorone Diamine | 14.4 | 14.4 | 14.4 | 13.1 |
| Acetonitrile | 350 | 350 | 350 | 250 |
| Water | 700 | 700 | 700 | 950 |
| EO Content (wt %)/Solid Content | 9 | 9 | 9 | 0 |
| Solid Content (wt %)/Aqueous Dispersion | 36 | 36 | 36 | 26 |
| Viscosity (mPa·s/25° C.)/Aqueous Dispersion | <30 | <30 | <30 | <30 |

Abbreviations in Table 2 are described below.

H$_{12}$MDI: 4,4'-methylenebis(cyclohexyl isocyanate), trade name Desmodule W, manufactured by Bayer Inc.

PLACCEL220: polycaprolactonediol having a number average molecular weight of 2000, trade name manufactured by Daicel Chemical Industries Ltd.

PTG2000SN: polytetramethylene ether glycol having a number average molecular weight of 2000, manufactured by Hodogaya Chemical Co., Ltd.

UH-200: polycarbonatediol having a number average molecular weight of 2000, manufactured by Ube Industries, Ltd.

POE side chain polyol A: polyoxyethylene side chain-containing polyol A

Example 4

Synthesis of Hydrophilic Resin A

A reaction vessel equipped with a homodisper capable of high-speed stirring was charged with 320 g of the aqueous dispersion of the aqueous polyurethane resin A, and 500 g of the aqueous dispersion of a second aqueous polyurethane resin A, and the mixture was stirred for 10 minutes at a rate of 2000 min$^{-1}$. Afterwards, the mixture was defoamed under reduced pressure, so that an aqueous dispersion of the hydrophilic resin A was obtained.

The content of the polyoxyethylene group (EO content (wt %)) in the obtained hydrophilic resin A calculated based on the mixing formulation, and the solid content (wt %) and the viscosity (mPa·s) of its aqueous dispersion are shown in Table 3.

Examples 5 to 9 and Comparative Example 3

Synthesis of Hydrophilic Resins B to G

Based on the mixing formulation shown in Table 3 below, aqueous dispersions of hydrophilic resins B to G were prepared in the same manner as in Example 4. In Example 9, the mixture was dehydrated under reduced pressure after the stirring to adjust the solid content concentration.

The content of the polyoxyethylene group (EO content (wt %)) in the obtained hydrophilic resins B to G calculated based on the mixing formulation, and the solid content (wt %) and the viscosity (mPa·s) of their aqueous dispersions are shown in Table 3.

TABLE 3

| Mixing Formulation (g) | | Example 4 | Example 5 | Example 6 | Example 7 | Example 8 | Example 9 | Comparative Example 3 |
|---|---|---|---|---|---|---|---|---|
| Hydrophilic Resin | | A | B | C | D | E | F | G |
| Aqueous Polyurethane Resin | Type | A | B | C | A | A | A | E |
| | Amount (Aqueous Dispersion) | 320 | 320 | 320 | 342 | 342 | 490 | 500 |
| Second Aqueous Polyurethane Resin | Type | A | A | A | B | C | A | D |
| | Amount (Aqueous Dispersion) | 500 | 500 | 500 | 500 | 500 | 500 | 500 |
| EO Content (wt %)/Solid Content | | 33.2 | 32 | 31.6 | 34.2 | 34.2 | 40.2 | 33.1 |
| Solid Content (wt %)/Aqueous Dispersion | | 33.7 | 33.3 | 32.9 | 33.7 | 33.7 | 35 | 25.5 |
| Viscosity (mPa·s/25° C.)/Aqueous Dispersion | | 1200 | 2500 | 5900 | 10000 | 4000 | 1600 | 18000 |
| Moisture Permeability Test A-1 method (g/m$^2$·24 hrs) | | 5400 | 5300 | 5000 | 5200 | 5200 | 6300 | 5300 |
| Mechanical Strength Test | Tensile Strength (MPa) | 12 | 11.2 | 12.2 | 7.5 | 14 | 9.4 | 13.2 |
| | Elongation Percentage (%) | 650 | 640 | 610 | 450 | 620 | 600 | 540 |
| | 100% Modulus Value (MPa) | 0.8 | 0.8 | 1 | 0.8 | 1 | 0.6 | 1.2 |

Example 10

Synthesis of Aqueous Polyurethane Resin F

A four-neck flask equipped with a reflux condensing tube, a nitrogen inlet tube, a thermometer, and a stirrer was charged with 67.6 g of 1,3-(bisisocyanatomethyl)cyclohexane (trade name: TAKENATE 600, manufactured by Mitsui Chemicals Polyurethanes, Inc.), 243.3 g of polyethylene glycol (trade name: PEG-1000, manufactured by TOHO Chemical Industry Co., LTD.) having a number average molecular weight of 1000, 39.1 g of the polyoxyethylene side chain-containing polyol A, and 150 g of acetonitrile, and the mixture was allowed to react under a nitrogen atmosphere with the reaction solution temperature adjusted to 75 to 78° C., so that the reaction rate of 99% or more was achieved in 7 hours. Then, the reaction product was cooled to 30° C., so that an isocyanate group-terminated prepolymer was obtained.

Next, 958.5 g of water was added to a reaction vessel equipped with a homodisper capable of high-speed stirring, and the isocyanate group-terminated prepolymer was added thereto with the temperature adjusted to 25° C. and with stirring and mixing at a rate of 2000 min$^{-1}$, so that the isocyanate group-terminated prepolymer was dispersed in water.

Thereafter, 2.1 g of ethylenediamine, 1.5 g of N-β (aminoethyl) γ-aminopropylmethyldimethoxysilane (amine value 544, trade name: KBM602, manufactured by Shin-Etsu Chemical Co., Ltd.), and 0.9 g of monoethanolamine were added thereto, and the mixture was stirred at 30 to 35° C. for 3 hours. Afterwards, acetonitrile and a portion of water were removed under reduced pressure, so that 1100 g of an aqueous dispersion of an aqueous polyurethane resin F was prepared.

The content of the polyoxyethylene group (EO content (wt %)) in the obtained aqueous polyurethane resin F calculated based on the mixing formulation, and the solid content (wt %) and the viscosity (mPa·s) of its aqueous dispersion are shown in Table 4.

Examples 11 to 13

Synthesis of Aqueous Polyurethane Resins G to I

Based on the mixing formulation shown in Table 4 below, an aqueous dispersion of an aqueous polyurethane resin G (Example 11), an aqueous dispersion of an aqueous polyurethane resin H (Example 12), and an aqueous dispersion of an aqueous polyurethane resin I (Example 13) were prepared in the same manner as in Example 10.

Also, as in Example 10, the content of the polyoxyethylene group (EO content (wt %)) in the obtained aqueous polyurethane resins G to I calculated based on the mixing formulation, and the solid content (wt %) and the viscosity (mPa·s) of their aqueous dispersions are shown in Table 4.

TABLE 4

| Mixing Formulation (g) | Example 10 | Example 11 | Example 12 | Example 13 |
|---|---|---|---|---|
| Aqueous Polyurethane Resin | F | G | H | I |
| H$_6$XDI | 67.6 | 67.6 | 67.6 | 67.9 |
| PEG-1000 | 243.3 | 243.3 | 243.3 | 254.8 |
| POE side chain polyol A | 39.1 | 39.1 | 39.1 | 27.3 |
| Ethylene Diamine | 2.1 | 2.1 | 1.8 | 1.8 |
| KBM-602 | 1.5 | — | — | — |
| Monoethanolamine | 0.9 | — | — | — |
| Diethanolamine | — | 3.1 | 1 | 1.1 |
| Aminoalcohol EA | — | — | 1.5 | 1.3 |
| Acetonitrile | 150 | 150 | 150 | 150 |
| Water | 958.5 | 960.3 | 958.1 | 957.7 |
| EO content(wt %)/Solid Content | 76.8 | 76.7 | 76.8 | 77.7 |
| Solid Content(wt %)/Aqueous Dispersion | 32.2 | 33 | 35.2 | 34 |
| Viscosity (mPa·s/25° C.)/Aqueous Dispersion | 6560 | 1830 | 4410 | 4730 |

Abbreviations in Table 4 are described below.

H$_6$XDI: 1,3-bis(isocyanatomethyl) cyclohexane, trade name TAKENATE 600, manufactured by Mitsui Chemicals Polyurethanes, Inc.

PEG-1000: polyethylene glycol having a number average molecular weight of 1000, manufactured by TOHO Chemical Industry Co., LTD.

POE side chain polyol A: polyoxyethylene side chain-containing polyol A

KBM602: N-β (aminoethyl) γ-aminopropylmethyldimethoxysilane (amine value 544), manufactured by Shin-Etsu Chemical Co., Ltd.

Aminoalcohol EA: N-(2-aminoethyl) ethanolamine, manufactured by Nippon Nyukazai Co., Ltd.

Synthesis Example 6

Synthesis of Second Aqueous Polyurethane Resin E

A four-neck flask equipped with a reflux condensing tube, a nitrogen inlet tube, a thermometer, and a stirrer was charged with 86.4 g of 4,4'-methylenebis(cyclohexyl isocyanate)(trade name: Desmodule W, manufactured by Bayer Inc.). 226.6 g of polytetramethylene ether glycol (trade name: PTHF2000, manufactured by BASF Japan) having a number average molecular weight of 2000, 2.5 g of ethylene glycol, 11 g of dimethylol propionic acid (trade name: Bis-MPA, manufactured by Perstorp), 143.5 g of acetonitrile, and 79.7 g of acetone, and the mixture was allowed to react under a nitrogen atmosphere with the reaction solution temperature adjusted to 75 to 78° C., so that the reaction rate of 99% or more was achieved in 7 hours. Then, the reaction product was cooled to 30° C., and 8.3 g of triethylamine was added thereto while stirring to sufficiently neutralize, so that an isocyanate group-terminated prepolymer was obtained.

Next, 1050 g of water was added to a reaction vessel equipped with a homodisper capable of high-speed stirring, and the isocyanate group-terminated prepolymer was added thereto with the temperature adjusted to 25° C. and while stirring and mixing at a rate of 2000 min$^{-1}$, so that the isocyanate group-terminated prepolymer was dispersed in water.

Thereafter, 15.2 g of isophorone diamine was added thereto, and the mixture was stirred at 30 to 35° C. for 3 hours. Afterwards, acetonitrile and a portion of water were removed under reduced pressure, so that 1000 g of an aqueous dispersion of a second aqueous polyurethane resin E was prepared.

The content of the polyoxyethylene group (EO content (wt %)) in the obtained second aqueous polyurethane resin E calculated based on the mixing formulation, and the solid content (wt %) and the viscosity (mPa·s) of its aqueous dispersion are shown in Table 5.

TABLE 5

| Mixing Formulation (g) | Synthesis Example 6 |
|---|---|
| Second Aqueous Polyurethane Resin | E |
| H$_{12}$MDI | 86.4 |
| PTHF2000 | 226.6 |
| Ethylene Glycol | 2.5 |
| Dimethylol Propionic Acid | 11 |
| Triethylamine | 8.3 |
| Isophorone Diamine | 15.2 |
| Acetonitrile | 143.5 |
| Acetone | 79.7 |
| Water | 1050 |
| EO content(wt %)/Solid Content | 0 |
| Solid Content(wt %)/ Aqueous Dispersion | 35 |
| Viscosity(mPa·s/25° C.)/ Aqueous Dispersion | 1010 |

Abbreviations in Table 5 are described below.

H$_{12}$MDI: 4,4'-methylenebis(cyclohexyl isocyanate), trade name Desmodule W, manufactured by Bayer Inc.

PTHF2000: polytetramethylene ether glycol having a number average molecular weight of 2000, manufactured by BASF Japan

Example 14

Synthesis of Hydrophilic Resin H

A reaction vessel equipped with a homodisper capable of high-speed stirring was charged with 476 g of an aqueous dispersion of the aqueous polyurethane resin F and 400 g of an aqueous dispersion of the second aqueous polyurethane resin E. Further, a tolylene diisocyanate-based blocked isocyanate (trade name: TAKENATE WB-700, manufactured by Mitsui Chemicals Polyurethanes, Inc.) was blended therein such that 5 parts by weight of the tolylene diisocyanate-based blocked isocyanate was blended relative to 100 parts by weight of the total amount of the aqueous dispersion of the aqueous polyurethane resin F and the aqueous dispersion of the second aqueous polyurethane resin E; and the mixture was stirred for 10 minutes at a rate of 2000 min$^{-1}$. Afterwards, the mixture was defoamed under reduced pressure, so that an aqueous dispersion of the hydrophilic resin H was obtained.

The content of the polyoxyethylene group (EO content (wt %)) in the obtained hydrophilic resin H calculated based on the mixing formulation excluding the amount of the blocked isocyanate blended therein, and the solid content (wt %) and the viscosity (mPa·s) of its aqueous dispersion are shown in Table 6.

Examples 15 to 18

Synthesis of Hydrophilic Resins I to L

Based on the mixing formulation shown in Table 6, aqueous dispersions of the hydrophilic resins I to L were prepared in the same manner as in Example 14. In Examples 17 and 18, water was blended in together with the aqueous dispersion of the aqueous polyurethane resin, and the aqueous dispersion of the second aqueous polyurethane resin.

The content of the polyoxyethylene group (EO content (wt %)) in the obtained hydrophilic resins I to L calculated based on the mixing formulation excluding the amount of the blocked isocyanate blended therein, and the solid content (wt %) and the viscosity (mPa·s) of their aqueous dispersions are shown in Table 6.

TABLE 6

| Mixing Formulation (g) | | Ex. 14 | Ex. 15 | Ex. 16 | Ex. 17 | Ex. 18 |
|---|---|---|---|---|---|---|
| Hydrophilic Resin | | H | I | J | K | L |
| Aqueous Polyurethane Resin | Type | F | G | F | H | I |
| | Amount (Aqueous Dispersion) | 476 | 500 | 437 | 520 | 536 |
| Second Aqueous Polyurethane Resin | Type | E | E | E | E | E |
| | Amount (Aqueous Dispersion) | 400 | 425 | 210 | 274 | 280 |
| Water | Amount | 0 | 0 | 0 | 48 | 30 |
| EO Content (wt %)/Solid Content | | 40.1 | 40.3 | 50.5 | 50.4 | 50.5 |
| Solid Content (wt %)/Aqueous Dispersion | | 33.5 | 33.9 | 33.1 | 33.1 | 33.1 |
| Viscosity (mPa·s/25° C.)/Aqueous Dispersion | | 5820 | 1410 | 6410 | 2280 | 2750 |
| Curing Agent (WB700) | Amount | 5 parts by weight | 5 parts by weight | 5 parts by weight | 5 parts by weight | 5 parts by weight |

TABLE 6-continued

| Mixing Formulation (g) | | Ex. 14 | Ex. 15 | Ex. 16 | Ex. 17 | Ex. 18 |
|---|---|---|---|---|---|---|
| Moisture Permeability Test A-1 Method (g/m² · 24 hrs) | | 6500 | 6900 | 8500 | 8600 | 8800 |
| Mechanical Strength Test | Tensile Strength (MPa) | 7.7 | 4.6 | 3.8 | 4.3 | 3.8 |
| | Elongation Percentage (%) | 380 | 360 | 320 | 340 | 350 |
| | 100% Modulus Value (MPa) | 1.9 | 1.6 | 1.5 | 1.7 | 1.6 |

Abbreviations in Table 6 are described below.

WB700: curing agent, tolylene diisocyanate-based blocked polyisocyanate, trade name: TAKENATE WB-700, solid content concentration 44 wt %, manufactured by Mitsui Chemicals Polyurethanes, Inc.

The mixing formulation of the curing agent shown in Table 6 is the amount (unit: parts by weight) of the curing agent blended relative to 100 parts by weight of the total amount of the aqueous dispersion of the aqueous polyurethane resin, the aqueous dispersion of the second aqueous polyurethane resin, and water that was blended in as necessary.

Evaluation

Moisture Permeability Test (Moisture Permeability Test A-1 Method)

The aqueous dispersion of the hydrophilic resin of Examples and Comparative Examples was cast to form a dry transparent film having a thickness of 0.02 mm. Thereafter, moisture permeability of the film was evaluated according to JIS L1099 (2006) A-1 method (calcium chloride method). The results are shown in Tables 3 and 6.

Mechanical Strength Test

The aqueous dispersion of the hydrophilic resin of Examples and Comparative Examples was cast to form a dry transparent film having a thickness of 0.1 mm. Thereafter, the film was cut into a strip of 1 cm, and a tensile test was performed with a condition of a tensile speed of 200 mm/minute. The stress at breakage (tensile strength (MPa)), the elongation percentage (%), and 100% modulus value (MPa) were measured. The results are shown in Tables 3 and 6.

In the above-described moisture permeability test and mechanical strength test, because the aqueous polyurethane resin E and the second aqueous polyurethane resin D which are anionic are blended in the aqueous dispersion of the hydrophilic resin G, the viscosity of the aqueous dispersion of the hydrophilic resin G was high, and its handleability was poor compared with the hydrophilic resins A to F.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

Industrial Applicability

The aqueous polyurethane resin of the present invention is suitably used as a hydrophilic modifier. Also, the hydrophilic resin of the present invention containing the aqueous polyurethane resin of the present invention is suitably used as a coating agent for a moisture-permeation and water-proof treatment. Furthermore, the film of the present invention obtained by using the hydrophilic resin of the present invention has excellent moisture-permeation and water-proof characteristics, and therefore is suitably used for a moisture-permeation and water-proof treatment.

The invention claimed is:

1. A hydrophilic resin comprising a first aqueous resin and a second aqueous resin, wherein
the first aqueous resin is an aqueous polyurethane resin obtained by reaction of an isocyanate group-terminated prepolymer with a chain extender containing diamines such that the equivalent ratio of an amino group in the chain extender relative to the isocyanate group in the isocyanate group-terminated prepolymor is 0.8 to 1.2,
wherein the isocyanate group-terminated prepolymer is obtained by reaction of components consisting of:
a polyisocyanate consisting of bis(isocyanatomethyl)cyclohexane,
a polyol component containing polyoxyethylen glycol having the number average molecular weight of 300 to 6000, and
a polyoxyethylene side chain-containing active compound having two or more hydroxyl groups or isocyanate groups at its molecular terminal and having a polyoxyethylene group in its side chain,
the second aqueous resin is an aqueous polyurethane resin obtained by reaction of an isocyanate group-terminated prepolymer with a chain extender containing diamines such that the equivalent ratio of an amino group in the chain extender relative to the isocyanate group in the isocyanate group-terminated prepolymer is 0.8 to 1.2,
wherein the isocyanate group-terminated prepolymer is obtained by reaction components consisting of:
a polyisocyanate consisting of methylenebis(cyclohexyl isocyanate),
a polyol component containing polytetramethylene ether glycol having the number average molecular weight of 300 to 10000, and
an ionic group-containing active compound having both carboxylic acid and two or more hydroxyl groups, wherein the content of the ionic group-containing active compound is 1.5 to 8 wt % relative to the total amount of the raw materials of the second aqueous resin.

2. The hydrophilic resin according to claim 1, which is used as a coating agent for a moisture-permeation and water-proof treatment.

3. A film obtained by using a hydrophilic resin, wherein the hydrophilic resin comprises a first aqueous resin and a second aqueous resin, wherein
the first aqueous resin is an aqueous polyurethane resin obtained by reaction of an isocyanate group-terminated prepolymer with a chain extender containing diamines such that the equivalent ratio of an amino group in the chain extender relative to the isocyanate group in the isocyanate group-terminated prepolymer is 0.8 to 1.2,
wherein the isocyanate group-terminated prepolymer is obtained by reaction components consisting of:
a polyisocyanate consisting of bis(isocyanatomethyl)cyclohexane, a polyol component containing polyoxyethylene glycol having the number average molecular weight of 300 to 6000, and a polyoxyethylene side chain-containing active compound having two or more hydroxyl groups or isocyanate groups at its molecular terminal and having a polyoxyethylene group in its side chain, the second aqueous resin is an aqueous polyurethane resin obtained by reaction of an isocyanate group-terminated prepolymer with a chain extender containing diamines such that the equivalent ratio of an amino group in the chain extender relative to the isocyanate group in the isocyanate group-terminated prepolymer is 0.8 to 1.2, wherein the isocyanate group-terminated prepolymer is obtained by reaction components consisting of:

a polyisocyanate consisting of methylenebis(cyclohexyl isocyanate), a polyol component containing polytetramethylene ether glycol having the number average molecular weight of 300 to 10000, and an ionic group-containing active compound having both carboxylic acid and two or more hydroxyl groups, wherein the content of the ionic group-containing active compound is 1.5 to 8 wt % relative to the total amount of the raw materials of the second aqueous resin.

\* \* \* \* \*